April 28, 1964 HIROSHI ONO ETAL 3,130,865
FLUID PRESSURE EJECTOR
Filed Dec. 27, 1960 2 Sheets-Sheet 1
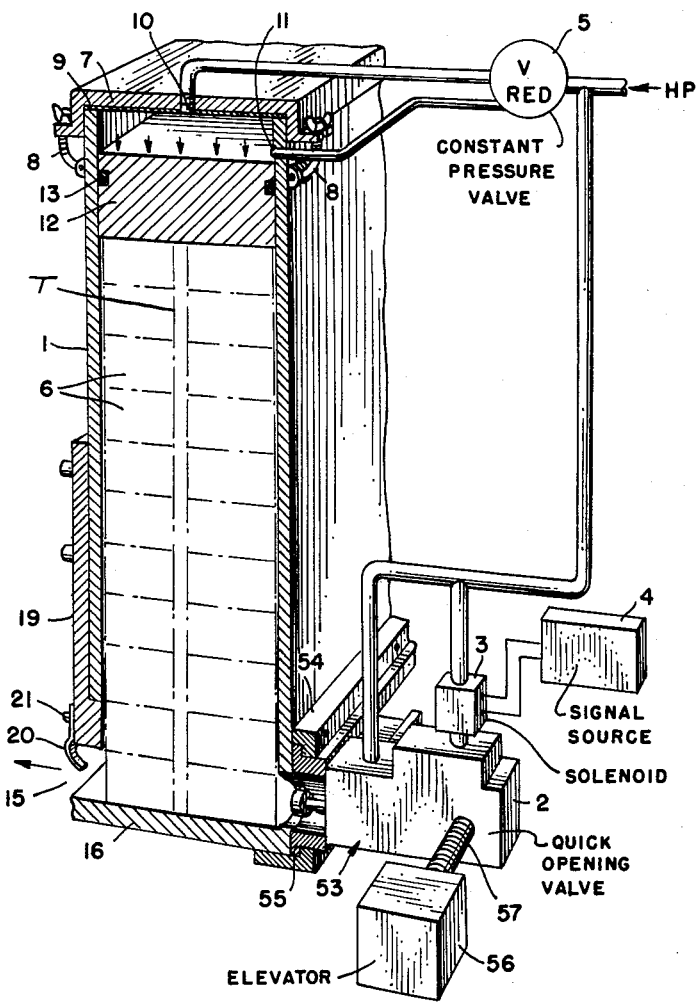
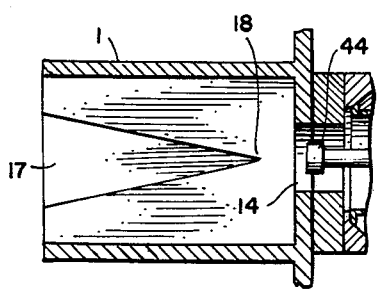
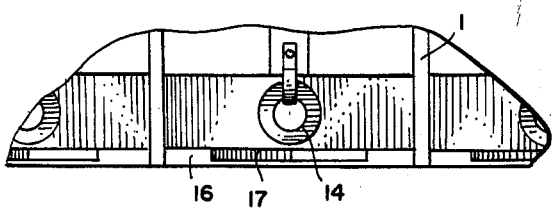
INVENTORS:
HIROSHI ONO
VALENTINE HECHLER IV April 28, 1964    HIROSHI ONO ETAL    3,130,865
FLUID PRESSURE EJECTOR
Filed Dec. 27, 1960    2 Sheets-Sheet 2

INVENTORS:
HIROSHI ONO
VALENTINE HECHLER IV
BY
ATT'Y

United States Patent Office 3,130,865
Patented Apr. 28, 1964

3,130,865
FLUID PRESSURE EJECTOR
Hiroshi Ono, Chicago, and Valentine Hechler IV, Northfield, Ill., assignors to Webcor, Inc., Chicago, Ill., a corporation of Illinois
Filed Dec. 27, 1960, Ser. No. 78,698
12 Claims. (Cl. 221—226)

This invention relates to ejectors in general and more particularly to ejectors for dispensing objects from a vehicle.

In view of the recent developments and use of radar and computers for automatically firing anti-aircraft weapons, it has been necessary to provide a counter means in an effort to jam or distract anti-aircraft pickup mechanisms. As proven during the second World War and the Korean conflict, a very effective counter means was to dump or eject large quantities of metallic foil from the aircraft, which provided a plurality of pickups on the radar equipment, thus rendering such anti-aircraft equipment useless and unable to distinguish which pickup was the aircraft.

The modern aircraft of today is designed for extreme speeds and altitudes. It is, therefore, necessary to design the needed electronic equipment and other operational equipment for these aircrafts within very narrow space and weight limits. Prior ejecting systems have utilized a bulky conveyor system to bring the packages of metallic foil to the ejector and the ejector mechanism itself utilized a large piston or arm member to push the metallic foil package out through the ejector doors installed in the side of the aircrafts. The conveyor system and the prior ejectors not only were large and bulky in size but also added a great deal of weight.

It is therefore the primary object of this invention to provide a lightweight, compact ejector which is capable of rapidly dispensing objects from a vehicle.

A specific object of this invention is to provide a novel mechanism for dispensing cartons of metallic foil in rapid succession from an aircraft.

Another object of this invention is to provide an air operated ejector which is automatic in operation for ejecting cartons of metallic foil from the side of a flying aircraft.

Another object of this invention is to provide a durable, efficient, lightweight, automatic air operated ejector which is simple and easy to manufacture at a reasonable cost, and adaptable to be mounted in existing aircraft without appreciable aircraft structural changes.

A still further object of this invention is to provide a simple ejector housing capable of supplying a plurality of metallic foil cartons to an ejecting chamber to be ejected from the side of an aircraft by the force of air pressure.

A still further object of this invention is to provide an improved ejector valve to supply an air pressure for ejecting the metallic foil carton from the side of an aircraft.

With these objects and other features and advantages of the invention in mind, which will appear from the following description and claims, taken in connection with the drawings, the invention consists in the novel construction, arrangement and formation of the parts wherein:

FIG. 1 is a fragmentary partially sectioned view in side elevation of the ejector system of this invention illustrating the relationship of the control components to the stacked packages to be ejected;

FIG. 2 is a fragmentary partially sectioned plan view of the bottom wall of the ejection chamber;

FIG. 3 is a fragmentary partially sectioned side elevation illustrating the bottom portion of the ejection chamber.

Figure 4:
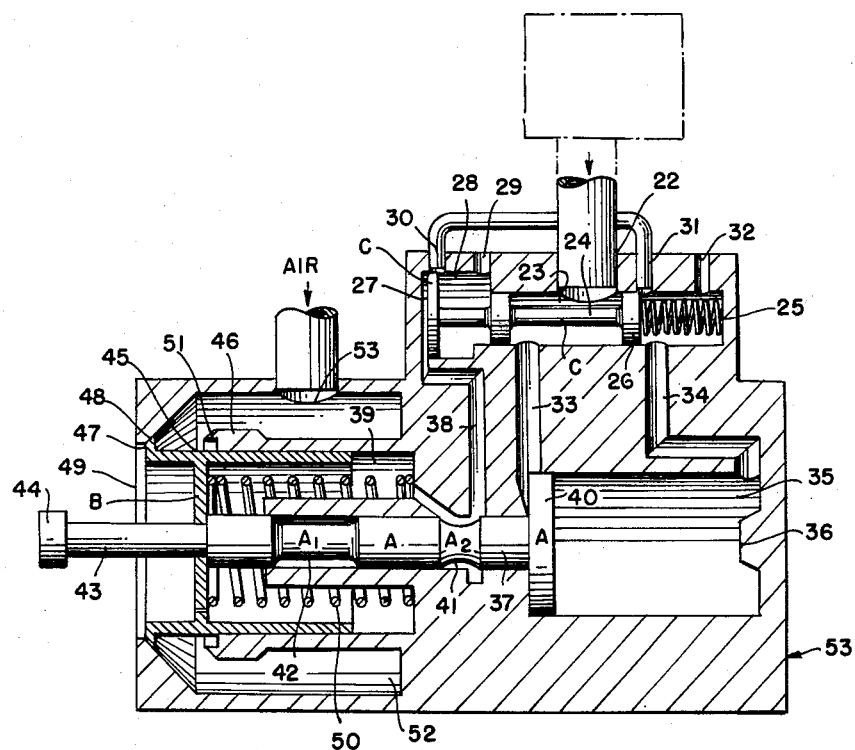
FIG. 4 is a sectional view in side elevation of the ejector valve of this invention.

Referring now to the drawings, the ejector system of this invention consists of a housing portion 1, an ejector valve 2, a solenoid valve 3, a signal source 4, and a constant pressure valve 5. Referring specifically to FIG. 1, the housing portion 1 is rectangular in shape to conform with the overall contour of metallic foil packages 6 which are to be ejected from the side of an aircraft. The housing 1 may be varied in dimensions and in height to accommodate any size metallic foil package 6 and for receiving a plurality of packages as they are stacked one on top of another and is preferably designed to receive several stacks of packages in parallel adjacent compartments. The upper portion of the housing 1 has a closure member 7 which is secured to the side walls of the housing 1 by a suitable quick disconnect member indicated by the numeral 8. A sealing gasket 9 is positioned between the housing portion 1 and the closure member 7 to form an effective airtight seal when the closure member 7 is clamped to the housing 1 by the members 8. A port 10 is formed in the closure member 7 of each of the compartments for connection to the constant pressure valve 5. Mounted on one of the side walls near the upper portion of the housing 1 is a sensing port 11 which is also connected to the constant pressure valve 5. As is viewed in FIG. 1, a plurality of the metallic foil cartons 6 are stacked in the housing 1 and may be retained in stacked relationship by a thin perforated tape T as indicated by the dotted lines passing across the side of the packages. The tape facilitates handling of the packages during loading operation yet is readily severable to permit individual carton ejection. A follower 12 is positioned on top of the uppermost carton 6 and has a sealing member 13 disposed therein to provide a leakproof seal between the side walls of the housing 1 and the inlet opening 10. The constant pressure valve 5 supplies low pressure air to an upper surface of the follower 12 through the inlet opening 10. To assure a constant force at all times by the follower 12 on to the cartons 6, the constant pressure valve 5, controlled by the pressure through the sensing line, connected to the port 11, will maintain a constant pressure at all times on the follower 12. Other suitable means may be employed for providing a smooth constant pressure onto the follower 12 and the method and structure illustrated in the drawings and described above is but one means which is readily adaptable for use with a pistonless, air actuated ejection mechanism of this invention.

A cylindrical inlet port 14 is centrally mounted in the lower portion of the rear side wall of the housing 1 and an adjustable ejection port 15 is mounted directly opposite the inlet portion 14 and the ejection port 15 are positioned adjacent to a bottom wall 16 of the housing 1.

Referring specifically to FIGS. 2 and 3, the bottom wall 16 has a V-shaped recessed area 17 with the apex 18 of the recessed area 17 adjacent to the inlet port 14. The function of this V-shaped recessed area will be described later.

The ejection port 15 may be adjusted, to vary with the different sizes of carton 6, by means of a sliding side wall member 19 which may be suitably secured to the side wall of the housing 1 by any quick releasing means. A resilient member 20 is secured by the screw 21 to the lower portion of the adjustable wall 19 to assist in retaining the lowermost carton 6 in the housing 1 until ejection time.

The ejection valve 2, to be described later, is connected to the inlet opening 14 and is operated through the signal source 4 which actuates the solenoid 3 which is in turn permits the high pressure air to operate the ejection valve 2 permitting a surge or flow of high pressure air to enter the inlet port 14. The valve 2 is slidably secured to the housing 1 by interlocking guide member 54 on the housing and guide member 55 formed on the valve. Thus, if the housing 1 is formed to accommodate more than one stack of cartons to be ejected, one ejection valve may serve all of the compartments by being repositioned to the compartment to be used.

The valve 2 is preferably repositioned to the selected compartment by an air actuated elevating device 56 which has a collapsible bellows 57 extending therefrom in connection with the valve 2. As the elevating device is actuated, the valve 2 will slide along guide member 54 until properly positioned in front of the desired compartment, bellows 57 expanding or contracting depending on direction of movement.

The ejector valve 2 has an air inlet port 22 which is connected directly to the electrically operated solenoid valve 3. The valve inlet port 22 terminates into the chamber 23 in which a shuttle piston member 24 is mounted. The piston member 24 is spring-loaded by a compression spring 25 which bears against an end wall of the chamber 23 and the outer surface of a land 26 on one end of piston 24. The piston 24 has two lands 26 of equal diameter spaced apart and a larger diameter land 27 at the other end. The land 27 mounts in an adjoining chamber 28 which is connected with the chamber 23. A pressure exhaust port 29 connects the chamber 28 with the atmosphere. Also leading from the chamber 28 is a bypass port 30 which is connected to a similar bypass port 31 in chamber 23. An exhaust port 32 joins the chamber 23 with the atmosphere similar to the exhaust port 29 of chamber 28. Leading from the chamber 23 are the passages 33 and 34 which terminate in a chamber 35. Integrally formed on one end of the chamber 35 is a stop button 36 which serves as a maximum limit of travel for a reciprocating piston 37. A channel 38 connects the chamber 28 with an air chamber 39. The reciprocating piston 37 has an end land 40, a groove 41, a groove 42, a reduced diameter portion 43, and an end land 44. A valve head 45 encircles the reduced diameter portion 43 of the piston 37. The valve head 45 reciprocates in the chamber 39 and is held in alignment with the piston 37 by the circular side wall 46 which is integrally formed in the valve 2. The valve head 45 has an end portion 47 which has a truncated or tapered portion 48 to provide a seat or sealing portion to effectively close off a discharge port 49 which is integrally formed in the valve 2. A compression spring 50 is positioned within the valve head 45 and maintains the valve head 45 in the closed position. The integrally formed wall member 46 has a shoulder section 51 for the receipt of the valve head end portion 47 when the valve head 45 is in the extreme open position. Encircling the integral walls 46 and the valve head 45 is an air pressure chamber 52. An inlet port 53 is formed in the valve 2 to connect the air chamber 52 with a source of high pressure air which is to be used to eject the metallic foil cartons 6.

In operation, the ejector valve operates as follows: first, as the solenoid valve 3 is actuated by the signal source 4, the high pressure air is admitted into the port 22 of the valve housing 2. The piston 24 being in the extreme open position, as shown in the drawing by the force of the compression spring 25, permits the incoming air to enter chamber 23 and pass downwardly through the channel 33 to come in contact with the land 40 of the piston 37. As the incoming air pressure comes in contact with the land 40, the reciprocating piston 37 is forced to the right. Upon sufficient travel to the right by the piston 37, the end land member 44 will contact the valve head 45 and force the valve head 45 to the right into an open position. As the piston 37 moves to the right, the groove 42 will vent the channels 33 to 38 thus directing air pressure to the enlarged diameter land 27 of the piston 24. As the pressure builds up against the land 27 the piston 24 will move to the right, thus shutting off air to the large land 40 of piston 37 and by the same action venting channel 33 to chamber 28 thus exhausting air pressure from land 40 through exhaust channel 29. The by-pass 30 and 31 will assure that the piston 24 will be held into the closed position until the incoming air from the solenoid valve is closed. As the land 44 of the piston 37 contacts the valve head 45 and forces the valve head 45 to the right, thus opening the discharge port 49; the air pressure built up in the chamber 52 is quickly released and permits a surge or build-up pressure into the port 14 to come in contact with the rear wall portion of the metallic foil carton 6. As the piston 24 moves to the right, a four-way valve action takes place. High pressure air from channel 22 is diverted to channel 34, the exhaust channel 32 is sealed off from channel 34, high pressure air is sealed off from channel 33 and exhaust channel 29 is connected to channel 33. There will be no air pressure on the inside face of land 40 and high pressure air in chamber 35. The difference in pressures move piston 37 to the left or closed position. The piston 37 moves to the left, with a higher velocity than valve head 45, which had been accelerated by a relatively weak spring 50. The piston 37 engages valve head 45 and forces the valve head into a closed position. The closing action of the valve as described above is accomplished by spring 50 at a much slower rate, should the solenoid 3 be unintentionally de-energized during the cycle. The groove 41, as the piston 37 moves to the left, will connect channel 38 to chamber 39 to allow the high pressure air acting on land 27 to slowing exhaust to the atmosphere. Channels 30 and 31 are made large enough to assure an equilibrium pressure acting on land 27 to keep valve 24 in the extreme right position against the spring 25. With the shutting off of the solenoid valve by the signal source 4, the piston 24 will return to its normally closed position.

It is quite obvious, that through the operation of the above described valve that as the mass of the piston 37 is accelerated and nears the end of its stroke, its inertia as well as its acceleration will pick up to the valve head 45 to move it away from the close position over the large discharge port area 49. When piston 37 reaches the end of its opening stroke, the longitudinal groove 42 of the piston 37 will vent the applied pressure to the secondary piston 24 to position the piston 24 in a closed position where it is held by this incoming pressure until the valve piston 37 has fully recovered itself. Thereupon, the pressure to piston 24 is partially relieved from holding it and a spring 25 will return it to an open position when free to do so. However, any pressure present would continue acting against the piston 37, urging the valve towards the closed position until such time as the solenoid 3 is closed, thereby permitting the valve piston 24 to exhaust to atmosphere with the valve piston 37 returning to its resting position for the next opening of the solenoid valve 3. In other words, as the solenoid valve is opened, the piston 24 being in a normally open position will direct the released air into the valve chamber 35 to provide a rapid build-up of pressure against the land 40 of the piston 37. As the piston begins to move to the right gaining momentum until it is near the end of its stroke, it strikes the valve head 45 knocking it open. The piston 37 immediately begins to reverse its stroke to close the valve head 45, whereupon the piston 24 is moved to a closed position against the spring 25 to permit the system to recover itself as described above.

Referring now more specifically to FIGS. 2 and 3, the lower wall 16 of the ejection housing 1 provides a V-shaped recessed area 17 with the apex 18 adjacent to the air inlet port 14. The plurality of stacked cartons 6 are forced against the bottom wall 16 by the constant feed pressure exerted against the follower 12. To assure proper ejection of each of the cartons as it is forced against the bottom wall 16, the next to bottom carton serves as the remaining wall for enclosing the ejection chamber from which the lowermost package is ejected by the air pressure through the inlet port 14. The ejection valve 2 as described above is only open less than ten-thousandths of a second and it is quite obvious that upon this brief application of compressed air from the ejection valve that the compressed air strikes the lowermost package with a jarring force. Since the package is secured due to frictional resistance and the thin perforated tape, a portion of the incoming air moves along the upper wall of the lower carton, severs the perforated tape and lifts the second lowermost carton a minute distance to permit the lowermost carton some freedom to move, whereupon the efforts of the compressed air becomes fully effective. With the second lowermost carton lifted slightly, the lowermost carton is easily expelled from its sealed position. As the lowermost carton begins to move, a portion of the incoming air will escape into the V-grooved section 17. The expanding of the air in the enlarged area of the V-groove develops a substantial reduction of pressure which assists in holding the package in position. The expansion of the incoming air, as it escapes into the recessed V-shaped area in the bottom wall and along the side walls of the cartons, creates sufficient turbulence to effectively rupture the carton to assure instantaneous blooming of the metallic foil upon completion of the ejection. As the lowermost package is ejected through the opening 15, the next package is forced against the bottom wall 16 by the constant feed pressure applied through the follower 12. Again, the secondmost lower package will serve as the upper wall of the ejection chamber to permit the constant firing or ejection of the cartons. The last carton 6 of the stack will also be ejected with the surface of the follower 12 serving as the upper wall of the ejection chamber. It is quite obvious from the foregoing description and the FIGS. 1, 2 and 3 that the lowermost carton upon being jarred or forced by the incoming high pressure air through the inlet port 14 will be completely surrounded by the air pressure, thus in sense is free to float, and will easily be ejected through the ejection port 15.

The sequence and rapidity of ejection may be readily controlled by the actuation of the solenoid valve 3. In addition, a continuous stream of chaff may be ejected since the ejecting mechanism may be instantaneously repositioned from one compartment to another as the supply of one is exhausted.

To those skilled in the art it is quite obvious that the structure provided by this invention will not only provide a savings in space and weight but also provides an efficient and adaptable mechanism for ejecting metallic foil cartons from the side of the aircraft. The structure of this invention also provides a convenient means for loading the metallic foil cartons into the housing and a simple adjustment for adapting the structure for any size of carton to be ejected.

Thus, it is seen that the invention has provided a new and useful ejection structure for ejecting objects from the side of an aircraft. It is realized that the actual details of the construction may be readily modified by one skilled in the art, and the inventors only intend to be limited to a reasonable interpretation of the appended claims covering the construction as illustrated and described.

We claim:

1. A vehicle carton ejecting system comprising a plurality of cartons of metallic foil in stacked relationship, a housing having side walls and a bottom wall defining a compartment in which the stacked cartons are positioned, said housing having an adjustable ejection port in one of said side walls and a pressure inlet port on the side wall opposite thereto, both of said ports being located adjacent to the bottom wall of the housing, a closure member detachably secured to the housing at an upper end, a follower member positioned on top of the uppermost carton of said stack, a constant feed pressure applied to said follower to force the stacked cartons in a downward direction against the bottom wall, said bottom wall having a recessed V-shaped portion therein with the apex of the recessed area adjacent to the inlet port, a quick opening high pressure air valve connected to the inlet port to provide sufficient air pressure to force the lowermost carton out through the ejection port, said air pressure acting against one end of the carton to force it in an outward direction towards the ejection port and at the same time acting on the lower surface of the secondmost lower carton to raise said carton to permit movement of the lowermost carton, said air pressure upon reaching the recessed V-shaped portion of the bottom wall substantially reducing in pressure to prevent raising of the lowermost carton and said reduced air pressure passing beneath and along the sides of said lowermost carton to create enough turbulence to sufficiently rupture the carton to insure complete blooming of the metallic foil as the ejection is completed, and controlling means connected to said air valve to vary the rate of operation of the valve means to provide a rapid ejection of the cartons.

2. A carton ejecting system comprising a housing having side walls and bottom walls defining a plurality of elongated side by side compartments each having a cross-sectional contour closely following the contour of cartons stacked against each other in the compartments, means urging said stacked objects towards the bottom walls to dispose the lowermost carton in each compartment against the bottom wall thereof and the next lowermost carton against the lowermost carton to form an upper wall in each compartment which in cooperation with the bottom and side walls around the lowermost carton provides an ejection chamber for the lowermost carton in the respective compartments, an ejection port for each chamber positioned in one of said side walls of each compartment for the passage of the lowermost carton therethrough, a pressure inlet port for each chamber positioned in the one of said side walls in each compartment directly opposite the respective ejection ports and disposed between said upper and bottom walls, said pressure inlet ports being disposed side by side, valve means for applying ejection pressure against lowermost packages between said upper and bottom walls of the respective chambers to eject the lowermost carton through its respective ejection port and vent the ejection chamber for reception of the next lowermost carton therein, and control means for locating said valve means selectively at each of the inlet ports and including an electrically controlled device for actuating said valve means when so located.

3. A vehicle object ejecting system for rectangular shaped objects comprising an elongated housing having side walls and a bottom wall defining a compartment having a cross-sectional contour following the contour of the largest cross-sectional areas of the objects to be ejected, said objects being positioned one on top of another in stacked relation with adjacent flat faces thereof in sliding contact with each other within the housing with the lowermost one resting on the bottom wall, a follower member within the housing positioned on top of the uppermost stacked object, a closure member to seal the upper end of the housing, pressure means applied on the follower to urge the stacked objects in a downward direction against said bottom wall, an ejection port opening directly to atmosphere positioned in one of the side walls of the housing adjacent to the bottom wall, a fluid pressure inlet port positioned in the one of said side walls directly opposite said ejection port, valve means connected to said inlet port to apply a fluid ejection pressure to the lowermost one of said objects through said ejection port while the next lowermost stacked object resting thereon is increasingly exposed to and urged upwardly by said ejection pressure upon ejection movement of the lowermost object, and control means to vary the operation of the valve means to provide a rapidly recurring ejection of objects through said ejection port.

4. A carton ejecting system comprising a housing having side walls and a bottom wall defining a compartment having a cross-sectional contour closely following the contour of cartons stacked against each other in the compartment, means urging said stacked objects in towards the bottom wall to disposed the lowermost carton against the bottom wall and the next lowermost carton against the lowermost carton to form an upper wall which in cooperation with the bottom and side walls around the lowermost carton provides an ejection chamber for the lowermost carton, an ejection port positioned in one of said side walls for the passage of the lowermost carton therethrough, a fluid pressure inlet port positioned in the one of said side walls directly opposite said ejection port and disposed between said upper and bottom walls, valve means connected to said inlet port to apply fluid ejection pressure against said lowermost package between said upper and bottom walls to eject the lowermost carton through said ejection port while the next lowermost caron is urged upwardly by said pressure and to vent said ejection chamber of said pressure for reception of the next lowermost carton therein, and control means for actuating said valve means, said bottom wall having a V shaped recess therein with the apex of the V-shape adjacent to the inlet port.

5. A carton ejecting system comprising a housing having side walls and a bottom wall defining a compartment having a cross-sectional contour closely following the contour of cartons stacked against each other in the compartment, means urging said stacked objects in towards the bottom wall to dispose the lowermost carton against the bottom wall and the next lowermost carton against the lowermost carton to form an upper wall which in cooperation with the bottom and side walls around the lowermost carton provides an ejection chamber for the lowermost carton, an ejection port positioned in one of said side walls for the passage of the lowermost carton therethrough, a fluid pressure inlet port positioned in the one of said side walls directly opposite said ejection port and disposed between said upper and bottom walls, valve means conncted to said inlet port to apply fluid ejection pressure against said lowermost package between said upper and bottom walls to eject the lowermost carton through said ejection port while the next lowermost carton is urged upwardly by said pressure and to vent said ejection chamber of said pressure for reception of the next lowermost carton therein, and control means for actuating said valve means, said valve means consisting of a quick opening high pressure air valve having a large area discharge port.

6. A carton ejecting system comprising a housing having side walls and a bottom wall defining a compartment having a cross-sectional contour closely following the contour of cartons stacked against each other in the compartment, means urging said stacked objects in towards the bottom wall to dispose the lowermost carton against the bottom wall and the next lowermost carton against the lowermost carton to form an upper wall which in cooperation with the bottom and side walls around the lowermost carton provides an ejection chamber for the lowermost carton, an ejection port positioned in one of said side walls for the passage of the lowermost carton therethrough, a fluid pressure inlet port positioned in the one of said side walls directly opposite said ejection port and disposed between said upper and bottom walls, valve means connected to said inlet port to apply fluid ejection pressure against said lowermost package between said upper and bottom walls to eject the lowermost carton through said ejection port while the next lowermost carton is urged upwardly by said pressure and to vent said ejection chamber of said pressure for reception of the next lowermost carton therein, and control means for actuating said valve means, said control means consisting of an electrically operating signal source which actuates a solenoid valve to permit air to pass to the valve means.

7. A carton ejecting system comprising a housing having side walls and a bottom wall defining a compartment having a cross-sectional contour closely following the contour of cartons stacked against each other in the compartment, means urging said stacked objects in towards the bottom wall to dispose the lowermost carton against the bottom wall and the next lowermost carton against the lowermost carton to form an upper wall which in cooperation with the bottom and side walls around the lowermost carton provides an ejection chamber for the lowermost carton, an ejection port positioned in one of said side walls for the passage of the lowermost carton therethrough, a fluid pressure inlet port positioned in the one of said side walls directly opposite said ejection port and disposed between said upper and bottom walls, valve means connected to said inlet port to apply fluid ejection pressure against said lowermost package between said upper and bottom walls to eject the lowermost carton through said ejection port while the next lowermost carton is urged upwardly by said pressure and to vent said ejection chamber of said pressure for reception of the next lowermost carton therein, and control means for actuating said valve means, said bottom wall including a recess of increasing cross-sectional area towards said ejection port.

8. A carton ejecting system comprising a housing receiving a stack of cartons therein having parallel flat faces slidably engaging each other between contacting cartons, means for ejecting the end carton of the stack defined in part by a walled fluid pressure ejection chamber receiving the end carton, means to apply against the end carton disposed in said chamber a fluid under pressure in a direction parallel to the plane of the flat sides thereof, one of the walls of the ejection chamber being formed by the flat side of the next carton in contact with the end carton in the ejection chamber, said next carton being progressively exposed to applied ejection fluid under pressure with the ejection movement of said end carton from the chamber and moveable thereby in a direction towards the remaining cartons in the stack transversely to the direction of ejection movement of the end carton from the ejection chamber, signal responsive quick opening high pressure valve means to apply said fluid pressure with a quick surge against the end carton in the chamber to be ejected, and signal means for controlling said valve means to vary the intervals between the actuation of the valve means to control rapid ejection of cartons from said stack.

9. The combination called for in claim 8 in which said quickly opening valve means includes a solenoid valve controlled by said signal means, a main valve having a large discharge port area opening directly into said ejection chamber and a pressure responsive element accelerated by air controlled by said solenoid valve to travel into inertial and accelerated contact with the main valve to knock it open and quickly release a surge of the ejection fluid under pressure through said port area against said end carton in the ejection chamber.

10. A carton ejecting system comprising a housing having side walls and a bottom wall defining a compartment receiving a stack of cartons therein having parallel flat faces between contacting cartons slidably engaging each other, said compartment having a cross-sectional contour closely following the contour of said flat faces of the cartons stacked in the compartment, means urging said stacked cartons towards the bottom wall to dispose the lowermost cartons against the bottom wall and the next lowermost carton against the lowermost carton to form a flat upper wall which in cooperation with the bottom and side walls around the lowermost carton provides an ejection chamber for the lowermost carton, an ejection port positioned in one of said side walls for the passage of the lowermost carton therethrough, a fluid pressure inlet port positioned in the one of said side walls directly opposite said ejection port and disposed between said upper and bottom walls, signal responsive valve means connected to said inlet port to apply fluid ejection pressure against said lowermost package between said upper and bottom walls to eject the lowermost carton through said ejection port while the next lowermost carton is increasingly exposed to and urged upwardly by said pressure and to vent said ejection chamber of said pressure for reception of the next lowermost carton therein, and signal means for actuating said valve means.

11. An object ejecting system for vehicles comprising a housing for the objects to be ejected defining in part a walled fluid pressure ejection chamber, means to apply a fluid under pressure against an object to be ejected, which object is disposed in said chamber, one of the walls of the ejection chamber being formed by the next to bottom object to be dispensed in contact with the object to be ejected and movable upwardly under applied ejection fluid pressure in a direction transverse to the direction of movement of the ejected object, valve means to apply said fluid pressure quickly against the object in the chamber to be ejected, and control means to vary the operation of the valve means to provide a rapid ejection of the objects, said objects being paper cartons containing metallic foil and being retained for handling in stacked relationship by a thin perforated tape passing along the side of the stacked paper carton objects that is readily severed with ejection of said paper carton object in said compartment and with said upward movement of said next paper carton object.

12. An object ejecting system for vehicles comprising a housing for the objects to be ejected defining in part a walled fluid pressure ejection chamber, one of said walls having an ejection aperture therein opening directly to open atmosphere, means to apply a fluid under pressure against an object disposed in said chamber to be ejected through said aperture, another one of the walls of the ejection chamber being formed by the next lowermost object in contact with the object to be ejected and movable upwardly under applied ejection fluid pressure in a direction transverse to the direction of movement of the ejected object, valve means to apply said fluid pressure quickly against the object in the chamber to be ejected, and control means to vary the operation of the valve means to provide a rapid ejection of the objects, said objects being frangible paper cartons containing metallic particles, said aperture opening directly to atmosphere, the carton structure and the quick application of fluid pressure comprising means for rupturing an ejected object as it leaves said ejection chamber for the dispension of its contents.

References Cited in the file of this patent

UNITED STATES PATENTS

| | | |
|---|---|---|
| 1,704,623 | McManamna | Mar. 5, 1929 |
| 1,743,576 | Smith | Jan. 14, 1930 |
| 1,873,677 | Traver | Aug. 23, 1932 |
| 1,915,512 | Bizzarri | June 27, 1933 |
| 2,462,922 | Temple | Mar. 1, 1949 |
| 2,493,868 | Griffin | Jan. 10, 1950 |
| 3,067,911 | Finley et al. | Dec. 11, 1962 |